INVENTOR.
DONALD RICHARD RANDOLPH
BY Lawrence W. Flynn
ATTORNEY

United States Patent Office 3,625,648
Patented Dec. 7, 1971

3,625,648
RECOVERY OF FLUORINE AND P₂O₅ FROM DILUTE AQUEOUS ACIDIC PHOSPHATIC SOLUTIONS
Donald Richard Randolph, Lakeland, Fla., assignor to American Cyanamid Company, Stamford, Conn.
Filed Dec. 15, 1969, Ser. No. 884,907
Int. Cl. C01b 25/32
U.S. Cl. 23—109
8 Claims

ABSTRACT OF THE DISCLOSURE

A process is provided for purifying dilute aqueous acidic phosphatic solutions. Fluorine and $P_2O_5$ values are realuminum and less than about 3% $P_2O_5$ and 1.5% fluorine, and recovering the $P_2O_5$ and fluorine values therefrom in a useable form.

BACKGROUND OF THE INVENTION

This invention relates generally to the processing of phosphate rock into wet process phosphoric acid and phosphate fertilizers. More particularly, it relates to a process for purifying dilute aqueous acidic phosphate solutions typically containing calcium, sulfate ion, silica, iron, and aluminum and less than about 3% $P_2O_5$ and 1.5% fluorine, and recovering the $P_2O_5$ and fluorine values therefrom in a useable form.

The manufacture of wet process phosphoric acid typically involves treating phosphate rock with a strong mineral acid to solubilize the phosphate constituents thereof as phosphoric acid. The ground rock is introduced into a reactor as a fine powder, at least 80%–100 mesh, and digested with sulfuric acid to yield a mixture of phosphoric acid and calcium sulfate. However, since the phosphate rock is a complex material and contains in addition to fluorapatite $[Ca_{10}(PO_4)F_2 \cdot CaCO_3]$, its principal constituent, contaminants such as silica, iron oxide, aluminum oxide and organic matter, the reaction of the mineral acid with the contaminants occurs simultaneously with the fluorapatite-acid reaction and results in the dissolution of the contaminants along with the dissolution of phosphate constituents. Thus, in order to recover the phosphoric acid from the reaction mixture, it is necessary to subject the mixture to several processing steps designed to separate the undesirable constituents from the phosphoric acid.

Gypsum (i.e. calcium sulfate dihydrate), the major contaminant in the reaction mixture is formed during the reaction and is removed by the relatively simple expedient of filtration. The filter cake is generally washed with water to recover as much $P_2O_5$ as possible. The cake is then slurried in water and pumped to settling ponds for disposal. The recovered phosphoric acid is further concentrated in evaporators. During the concentration process, a large amount of fluoride-bearing gases are evolved; the fluorides are dissolved in water and the water is then pumped to the settling ponds along with the gypsum. After the gypsum has settled, the water in the pond may be reused in the processing plant or, if abundant, as for example during the rainy season, it is discharged to streams or lakes. It is the process water from these ponds, or process water of similar chemical composition, which is meant by the term "dilute acidic aqueous phosphatic solutions" as used herein.

Before such water can be discharged, it must be treated to eliminate or reduce the phosphorus and fluorine content to acceptable levels and adjust the pH of the water to about neutral. The pH adjustment is generally achieved by "liming" to a pH of about 6 to 7. The limed water is then subjected to an additional settling period before discharge. While this practice is effective, it nevertheless leaves much to be desired, especially from the standpoint of economics. When it is recognized that generally about 2.0% to 5.0% of the total $P_2O_5$ and from 50% to 55% of the fluorine fed to the system are lost and that typically a single processing plant utilizes several hundred billion gallons of processing water per year containing some 15,000 to 25,000 tons of waste including 3,000 to 4,000 tons of $P_2O_5$ and 13,000 to 14,500 tons of fluorine, the need and importance of providing a satisfactory process for separation and recovery of these values from processing water becomes exceedingly clear.

Fluorine has heretofore been recovered from aqueous acidic phosphatic solutions in a variety of forms which are the outgrowth of a multiplicity of known defluorination techniques. From a commercial viewpoint, a particularly desirable form, however, in which to recover the fluorine is as an aqueous solution of hydrofluoric acid. This acid is conveniently prepared by contacting hydrogen fluoride (HF) gas with water in a scrubber or other suitable apparatus. To recover the fluorine as hydrogen fluoride, it is, of course, necessary to chemically alter the form in which the fluorine is found in the phosphate rock. Appreciable amounts of silica ($SiO_2$) are also ordinarily found in the rock and will be carried through the manufacturing process in contact with the fluorine. Unfortunately, hydrogen fluoride reacts with $SiO_2$ to form $SiF_4$ which can hydrolyze to fluosilicic acid thereby reducing the amount of fluorine recoverable as the desired hydrogen fluoride. Therefore in a process aimed at the recovery of fluorine as hydrogen fluoride or hydrofluoric acid, one of the major problems encountered is how to regenerate the fluorine from the rock as hydrogen fluoride without the hydrogen fluoride reacting with the omnipresent $SiO_2$ to form the unwanted $SiF_4$.

In accordance with the process of this invention it is now found that substantially all the fluorine content of dilute aqueous acidic phosphatic solutions can be separated from said solution as a solid precipitate of low $SiO_2$ content which is formed when the solution is treated with an aqueous lime solution in sufficient amount to adjust the pH to 2.6 to 5.0. The solid is then treated with an acid to liberate the fluorine as hydrogen fluoride gas which is then contacted with water to produce the desired aqueous hydrofluoric acid solution.

When the precipitation is carried out within the above described pH range, the solid precipitate which results contains, among other materials, about 99% of the fluorine originally present in the solution, in the form of calcium fluoride crystals. More importantly, while substantially all of the fluorine precipitates, surprisingly, very little of the $SiO_2$ precipitates with the result that the precipitate contains less than about 1.5% by weight $SiO_2$. The precise amount of $SiO_2$ present in the precipitate will depend on the pH employed with lower pH values resulting in lower $SiO_2$ contents in the precipitate.

Since the ratio of $SiO_2$ to fluorine in the precipitate is so low, no appreciable reaction occurs between the hydrogen fluoride liberated when the precipitate is contacted with acid and the $SiO_2$ whereas if the $SiO_2$ content where to exceed 1.5%, a sufficient amount of the hydrogen fluoride would react with $SiO_2$ to form unwanted $SiF_4$ as to render the process inoperative from the standpoint of recovering fluorine as hydrogen fluoride or aqueous hydrofluoric acid.

In effect, adjustment of the pH to the designated range results in preferential precipitation of the fluorine to produce a precipitate which not only contains substantially all of the fluorine originally present in the solution but also contains it in a relatively $SiO_2$ free environment which is most conductive to subsequent treatment of the precipitate with acid to yield the desired hydrogen fluoride. Furthermore, $P_2O_5$ values are then recoverable from either the acid solution following removal of the fluorine as the solid precipitate or from the solid precipitate itself following removal of the fluorine as gaseous hydrogen fluoride.

The use of aqueous lime solutions in various stages of phosphate manufacturing processes is generally known. U.S. Pat. 2,115,150, for example, teaches a two step defluorination process for 15–25% phosphoric acid wherein the majority of fluorine is removed by adding phosphate rock whereupon the remaining fluorine is removed by adjusting the pH of the acid solution to 3.5 to 4.0 with aqueous lime. This patent teaches the essentialness of a two step defluorination process with the brunt of the fluorine removal borne by the first step of rock addition. Moreover, the process is directed solely to fluorine removal and not recovery of fluorine in usable form such as hydrofluoric acid.

U.S. Pat. 2,799,557 teaches defluorination of dilute aqueous phosphoric acid solutions by adjusting the acid pH to 2.6–3.2 by addition of aqueous lime and thereby precipitating the fluorine out of solution. The patentee however, teaches that the process is operable only if the acid has a $P_2O_5$ content of 8–12% and contains an added oxidizing agent such as manganese dioxide so as to maintain the metallic impurities in an oxidized condition. Again the process is directed solely to removal of fluorine and not to its recovery in a useable form.

Such patents fail to teach precipitation of substantially all of the fluorine from extremely dilute $P_2O_5$ solutions by the single process step of adjusting the pH to a critical range. Moreover, such patents fail to teach the preparation of a precipitate which not only contains 99% of the fluorine originally available in the solution but which also contains less than 1.5% $SiO_2$ thereby permitting recovery of the fluorine in the highly desired form of aqueous hydrifluoric acid.

It is therefore an object of this invention to provide a process whereby by merely adjusting the pH of a dilute aqueous acidic phosphatic solution to 2.6–5.0 by use of an aqueous lime solution, substantially all of the fluorine in the solution is readily separated from the solution as a solid precipitate.

It is another object of this invention to remove the fluorine as a precipitate which is substantially free from $SiO_2$ thereby rendering it eminently suitable for acid treatment to recover the fluorine contained therein as the desired hydrogen fluoride.

It is a further object to provide a process for recovering $P_2O_5$ values from the defluorinated solution and the defluorinated precipitate.

It is also an object of this invention to provide a process for the removal of phosphorous and fluorine from dilute aqueous acidic phosphate solutions and thereby render such solutions suitable for discharge to public streams or similar water systems.

These and other objects of this invention will be apparent from a total reading of this specification.

SUMMARY OF THE INVENTION

In accordance with the process of this invention, a dilute aqueous acidic fluorine enriched phosphatic solution typically containing from about 0.3% to about 3.0% by weight $P_2O_5$ and from about 0.1% to about 1.5% fluorine by weight, as well as silica, calcium, sulfate ion, and occasionally iron and aluminum is treated with sufficient aqueous lime solution to raise the pH thereof to between about 2.6 and 5.0 causing a solid precipitate to form which contains, among other materials, about 99% by weight of the available fluorine as crystals of calcium fluoride. The precipitate is primarily a mixture of calcium fluoride and dicalcium phosphate. The precipitate is separated from the solution by filtration or other suitable means whereupon the solids are treated with an acid such as sulfuric, glacial acetic or perchloric at a temperature of about 20° C. to 100° C. whereupon gaseous hydrogen fluoride is evolved. This gas is recovered as an aqueous hydrofluoric acid solution by contacting it with water, aqueous caustic, or an aqueous solution of hydrofluoric acid in a scrubber or other suitable device. The defluorinated solids are then recycled to a phosphoric acid recovery system or to the acid-rock reactor of a wet process phosphoric acid plant for recovery of the $P_2O_5$ content. The defluorinated solution can then be treated with additional aqueous lime to raise the pH to 6–7 whereupon, after settling, it can be discharged into public streams or recycled to the phosphoric acid process for recovery of $P_2O_5$ content. Optionally, the defluorinated solution can be treated with additional aqueous lime to raise the pH to about 4.7 to 5.6 whereupon the solids formed are separated from the solution and the $P_2O_5$ content thereof recovered. The solution is then adjusted to a pH of about 6–7 with additional aqueous lime and either discharged as waste or recycled for recovery of its $P_2O_5$ content as described above.

DESCRIPTION OF THE PREFERRED EMBODIMENTS

Figure 1:
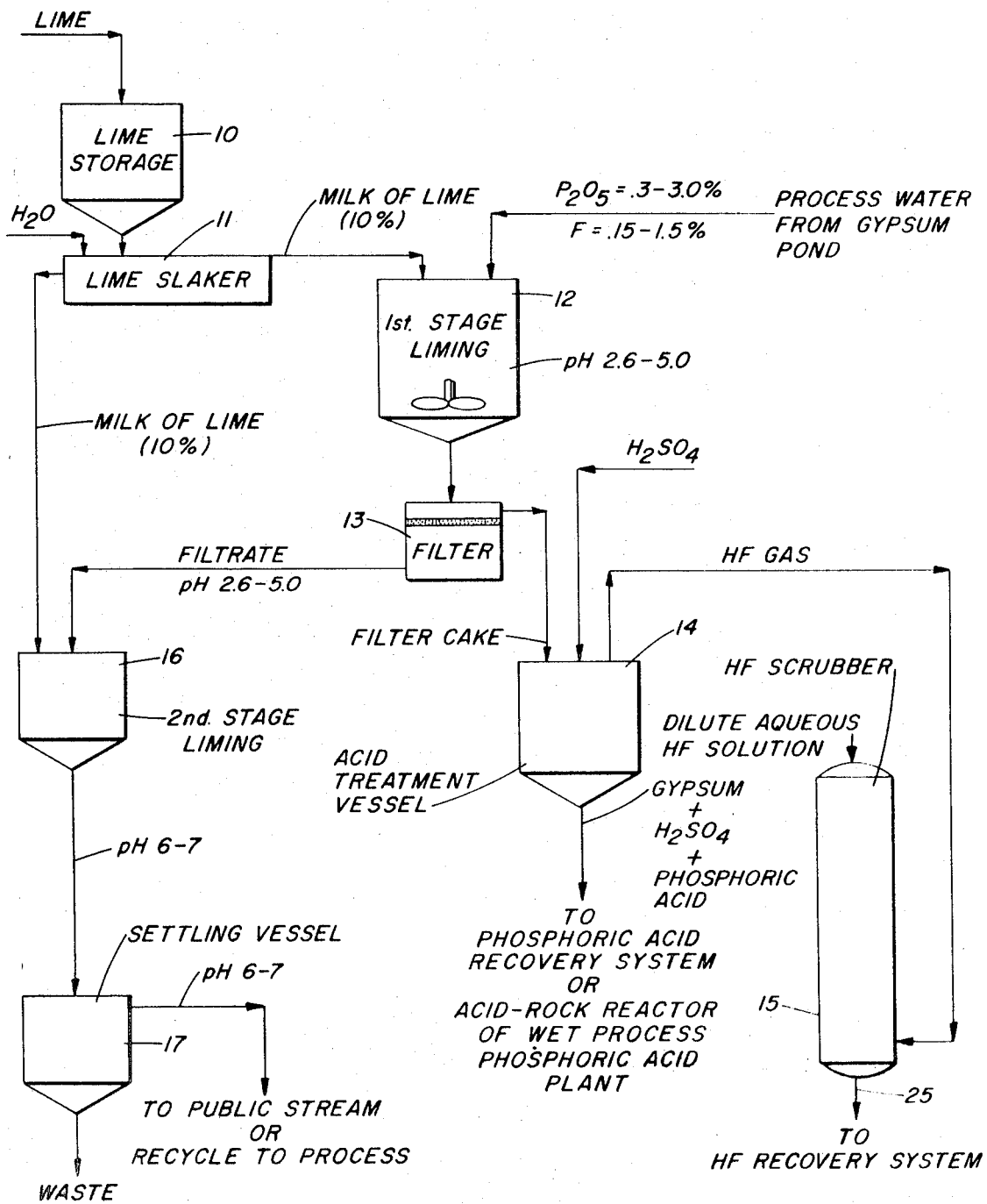
FIG. 1 is a schematic flow diagram illustrating the process of the invention.

Referring to FIG. 1, pebble lime from storage vessel 10 is introduced into slaker 11 where it is made up as a 10% aqueous milk of lime solution. This solution is then introduced into agitated first liming vessel 12 where it is admixed with process water, containing from 0.3 to 3.0% $P_2O_5$ and 0.15 to 1.5% fluorine, in sufficient amount to adjust the pH thereof to a predetermined value between about 2.6 and 5.0.

Figure 2:
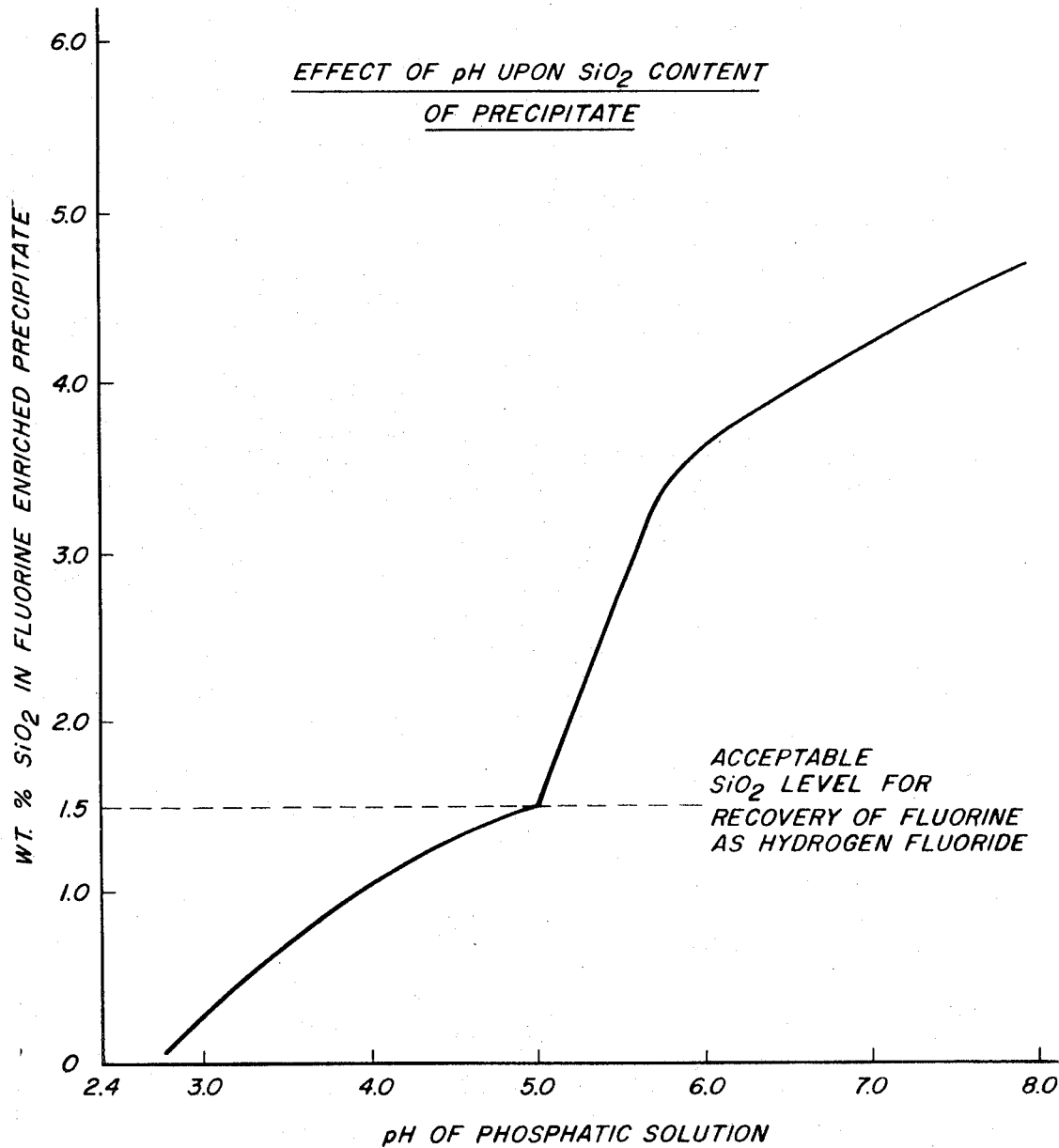
FIG. 2 is a plot of solution pH versus percentage of $SiO_2$ in the solid precipitate and indicates the criticality of the pH range with respect to maintaining a low (less than 1.5%) $SiO_2$ content in the precipitate.

The pH to which the dilute aqueous acidic phosphatic solution is initially adjusted is critical as heretofore discussed. If the pH is below about 2.6 substantially no precipitation will occur. On the other hand, if the pH exceeds about 5.0 precipitation of fluorine will occur; however, the precipitate will be enriched with $SiO_2$ to the extent that the $SiO_2$ content of the precipitate will exceed 1.5% by weight. The effect of pH upon $SiO_2$ content in the precipitate is best seen in FIG. 2 wherein the $SiO_2$ content in the precipitate is shown as a function of pH. As seen in FIG. 2, the $SiO_2$ content in the precipitate ranges from 0 to 1.5% as pH varies from about 2.6 to 5.0 whereas when the pH rises above 5.0, there is a remarkable and surprising elevation in the $SiO_2$ content of the precipitate to the range of 3 to 5% indicating a high degree of $SiO_2$ precipitation. It has been found that if the amount of $SiO_2$ in the precipitate exceeds about 1.5% by weight, it will react with the HF produced when acid is added to the precipitate to form $SiF_4$ to the degree that the process is no longer operative as a vehicle for recovering the fluorine as hydrogen fluoride. It thus becomes apparent that if fluorine is to be satisfactorily recovered as hydrogen fluoride, it is imperative that pH be maintained in the range of 2.6 to 5.0 in order to produce a precipitate which, upon treatment with acid, will yield hydrogen fluoride instead of substantial amounts of undesirable $SiF_4$.

When it is desirable to produce a very high quality hydrofluoric acid, liming is terminated when the pH of the process water approaches 3.5 and preferably between about 3.2 and 3.5. Where quality is less important, the pH may be adjusted to as high as 5.0. At a pH of 5.0, silica is still at an acceptable level (i.e. below 1.5%) and more than 99% of the fluorine and 80% of the $P_2O_5$ are precipitated and can be recovered. The primary reactions occurring in the first stage liming under the above specified conditions of the instant process may be shown as follows:

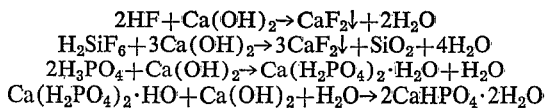

The suspension obtained from first stage liming vessel 12 is then subjected to a separation treatment to remove the solid materials from the liquid. In practice, the suspension is generally filtered as shown at 13 in FIG. 1. Other methods of separation may be employed as, for example, centrifugation, settling, or a combination of such treatments, the important step, of course, being the separation and recovery of both the filter cake and the filtrate.

Filter cake from filter 13 is introduced into acid reactor 14 where it is admixed with an acid, preferably anhydrous, such as sulfuric acid, glacial acetic acid or perchloric acid and preferably sulfuric acid. The reaction may be conducted at a temperature between about 20° C. and 100° C. at atmospheric pressure. A slight excess of acid over the stoichiometric requirement is usually employed; however, a substantial excess of acid may be used if desired (i.e. 2 or 3 mole equivalents). This reaction liberates gaseous HF and is represented by the following equation:

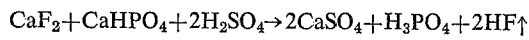

If silica is present in the filter cake in significant amounts (more than 1.5%) it will react with the HF thus produced to form silicon tetrafluoride which hydrolyzes to fluosilicic acid, an undesirable occurrence where HF recovery is desired. Thus, the importance of proper pH control in the first stage liming is again evident.

The HF produced by the above reaction is conducted from acid reactor 14 to HF scrubber 15 where it is absorbed in dilute aqueous HF solution, water, sodium hydroxide solution, or a similar solution from which HF is readily recovered; dilute aqueous hydrofluoric acid is preferred.

The reaction mixture from which HF has been evolved is primarily a mixture of sulfuric acid, phosphoric acid, and gypsum; as such it can be introduced directly into the recovery system of the phosphoric acid plant or it may be introduced into the acid-rock reactor. Where excess sulfuric acid is used in the filter cake treatment, the latter course is frequently most desirable. In either case the $P_2O_5$ content is thus recovered.

The filtrate, from filter 13 has a pH between 2.6 and 5.0 and as such is not suitable for discharge to public streams or lakes. It is therefore introduced into a second stage liming vessel 16 where it is treated with a 10% milk of lime solution in sufficient amount to adjust the pH thereof to between 6 and 7. Following adjustment the aqueous gypsum suspension which is formed is introduced into settling vessel 17 and permitted to stand until the solids in this second stage liming have settled.

These solids are waste materials and may be treated as such. The water remaining after solids separation is effected is suitable for discharge to public waters or may be recycled to the phosphoric acid plant for use.

Figure 3:
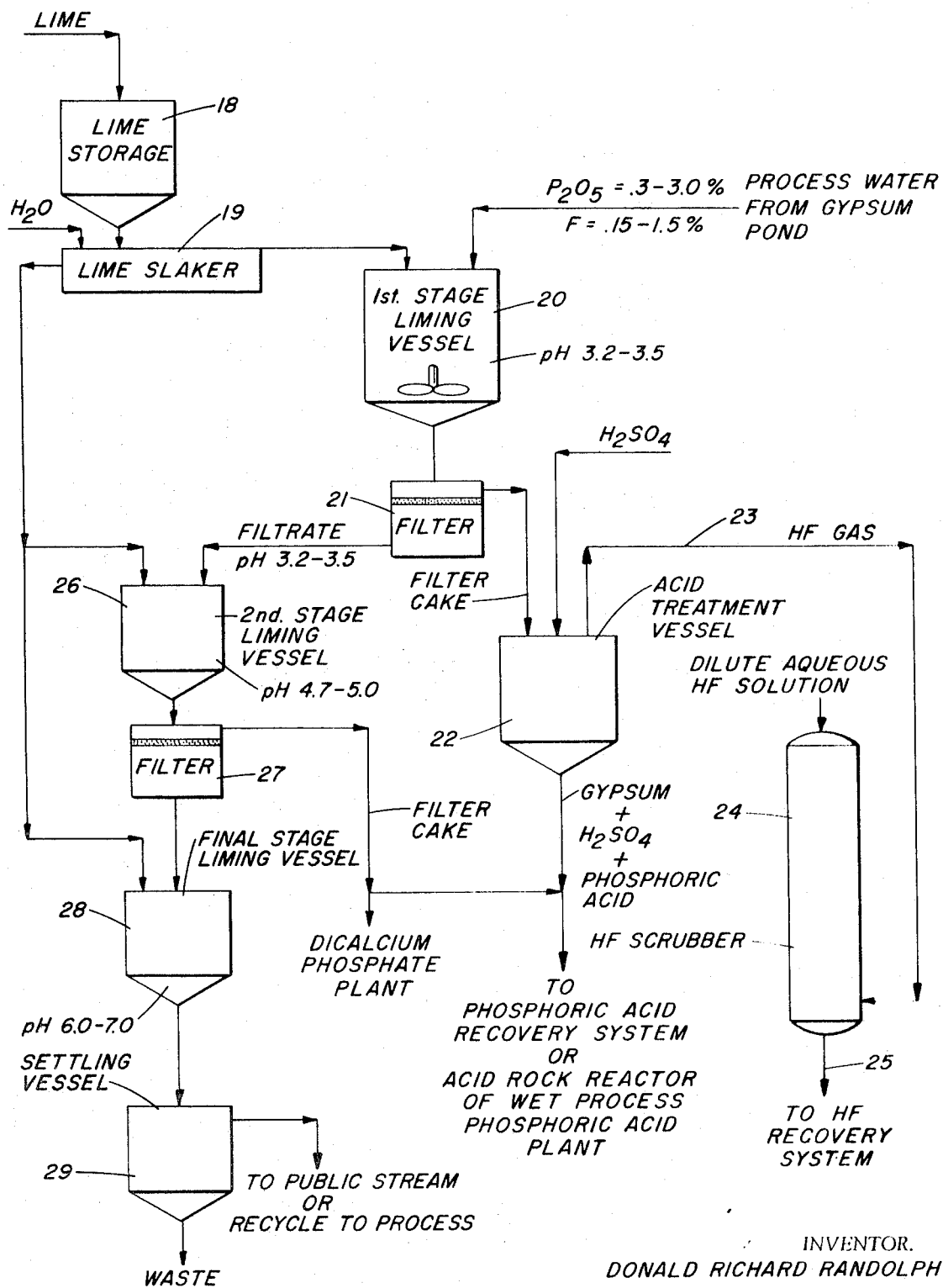
FIG. 3 is a schematic flow diagram of a preferred embodiment of the inventive process.

FIG. 3 illustrates another embodiment of the invention and involves multiple liming and separation steps. Referring to FIG. 3, lime from storage bin 18 is introduced into a slaker 19 where it is made up as a 10% aqueous milk of lime solution. Pond or process water from the phosphoric acid plant containing from about 0.3% to 3.0% $P_2O_5$ and 0.15 to 1.5% fluorine is introduced into first liming vessel 20 where it is admixed with a 10% milk of lime solution and the pH thereof adjusted to between 3.2 and 3.5. Such pH adjustment causes crystallization of calcium fluoride and the precipitation of more than 99% of the fluoride present in the pond water. It also causes the precipitation of about 28% of the $P_2O_5$ as dicalcium phosphate.

After treatment, the thus formed suspension is subjected to a separation step to remove the solids from the suspension. As shown, filter 21 is provided for such separation. However, the separation may also be achieved by other conventional means including clarifiers, cyclone separators, thickeners or similar apparatus or a combination thereof.

The filter cake from filter 21, comprising primarily calcium fluoride and calcium phosphate, is introduced into acid reactor 22 where it is treated with approximately an equimolar amount of sulfuric acid. The reaction is exothermic and is conducted at a temperature between about 50° and 100° C. The hydrogen fluoride evolved in this reaction is passed to scrubber 24 through conduit 23. The scrubbing solution is dilute aqueous hydrofluoric acid which is passed to a conventional HF recovery system, not shown, through conduit 25.

The filtrate from filter 21 having a pH between about 3.2 and 3.5 and essentially free of fluorine is pumped to second stage liming vessel 26 where it is treated with milk of lime solution from slaker 19. A sufficient amount of this solution is admixed with the filtrate to adjust the pH thereof to between about 4.7 and 5.6 and preferably between 4.7 and 5.0. This treatment results in the precipitation of an additional 50% or more of the total $P_2O_5$ originally present in the pond or processing water. The precipitate is principally fluorine-free dicalcium phosphate. If the pH is below about 4.7 no substantial precipitation occurs whereas if the pH exceeds about 5.6, substantial amounts of undesirable tricalcium phosphate precipitate with the dicalcium phosphate.

The precipitate is then separated from the formed suspension by filtration through filter 27. The filter cake may be sent directly to a dicalcium phosphate recovery system and used as feed grade dicalcium phosphate or admixed with the gypsum-sulfuric acid-phosphoric acid slurry from acid treatment vessel 22, for recovery as phosphoric acid. In either case the $P_2O_5$ value is recovered.

The filtrate from filter 27 is pumped to final stage liming vessel 28 where admixed with milk of lime and it and the pH adjusted to between 6 and 7. This treatment forms an aqueous suspension which is passed to settling vessel or pond 29 where the solids are permitted to settle. The water remaining is then essentially free of objectionable or toxic materials and can be discharged to public streams or reused in the processing plan. The solids are disposed of as waste materials.

The following examples are provided to further illustrate the invention.

EXAMPLE 1

500 ml. portions of processing water obtained from the manufacture of wet process phosphoric acid, having a pH of about 1.0 and containing 0.9% $P_2O_5$ by weight and 0.45% by weight of fluorine are placed in separate beakers and treated with a 10.0% milk of lime solution to a variety of pH values between 2.9 and 9.0. The solutions are then filtered and the filter cake analyzed for $P_2O_5$, F, CaO, $SiO_2$, $Fe_2O_3$, $Al_2O_3$, $SO_4^=$ and $H_2O$. The analyses shown below indicate that materials precipitated at pH 3.5 and below are essentially free of silica and materials precipitated at pH 5.0 and below contain only a very minor amount of silica. At pH values above 5.0, the amount of silica in the precipitated material increases so significantly as to render the precipitate valueless as a source material for fluorine and $P_2O_5$ recovery. The critical constituent in the precipitated material is, therefore, $SiO_2$ since when the calcium fluoride is subsequently acidulated, the $SiO_2$ present will form silica tetrafluoride which is detrimental to the desired product, HF, if an excessive amount is present in the precipitate. In turn, the silica content is a function of pH as clearly shown by the data of FIG. 2 which is merely a plot of a portion of the data shown below.

CHEMICAL ANALYSIS OF FILTER CAKE

| pH | Percent | | | | | | | |
|---|---|---|---|---|---|---|---|---|
| | $P_2O_5$ | F | CaO | $SiO_2$ [a] | $Fe_2O_3$ | $Al_2O_3$ | $SO_4$= | $H_2O$ [b] |
| 2.9 | 8.10 | 31.68 | 57.38 | 0 | | | | |
| 3.5 | 17.33 | 27.40 | 49.34 | 0.74 | 0.76 | 2.31 | 1.75 | 6.6 |
| 4.0 | 20.04 | 24.42 | 48.26 | 1.03 | | | | |
| 4.5 | 24.28 | 20.11 | 46.88 | 1.40 | 0.56 | 1.69 | 1.14 | 6.3 |
| 5.0 | 27.60 | 16.41 | 45.20 | 1.48 | | | | |
| 5.5 | 28.24 | 14.41 | 44.02 | 3.40 | 0.40 | 1.11 | 0.67 | 6.9 |
| 6.0 | 27.92 | 13.66 | 47.78 | 3.25 | | | | |
| 7.0 | 25.39 | 12.00 | 47.08 | 4.63 | | | | |
| 8.0 | 19.71 | 9.56 | 36.82 | 4.31 | | | | |
| 9.0 | 22.98 | 9.98 | 47.08 | | | | | |

[a] By X-ray fluorescence.
[b] Loss at 105° C.

| pH | Recovery of original F and $P_2O_5$ in filter cake, percent | |
|---|---|---|
| | F | $P_2O_5$ |
| 2.9 | 99+ | |
| 3.5 | 99+ | 33 |
| 4.0 | 99+ | 40 |
| 4.5 | 99+ | 58 |
| 5.0 | 99+ | 80 |
| 5.5 | 99+ | 92 |

EXAMPLE 2

A 155 g. sample of precipitate obtained by the procedure of Example 1 above, with liming to pH 3.5, has the following analysis:

| | Percent |
|---|---|
| CaO | 54.48 |
| $P_2O_5$ | 10.01 |
| F | 27.78 |
| F | 0 |

The above sample is treated with 200 g. of concentrated sulfuric acid. The reaction is run in an all plastic system utilizing a one gallon plastic jug fitted with a sulfuric acid delivery buret and a gas exit tube. The gases generated by the reaction are drawn by a slight vacuum through a coil immersed in ice water and into two scrubbers in series. A 5.0% solution of sodium hydroxide is used as the scrubbing solution and it is found that 67% of the fluorine present in the precipitate is evolved as hydrogen fluoride and 49% of the fluorine is recovered. Similar results are obtained when a dilute aqueous hydrogen fluoride solution is employed as the scrubbing solution.

EXAMPLE 3

Two gallons of pond water (8850 p.p.m. $P_2O_5$ and 3790 p.p.m. F) from a wet process phosphoric acid plant, having a pH about 1.5 and from which gypsum has been removed by settling, are placed in a first stage liming vessel equipped with a stirrer. Lime is added incrementally to the water to adjust the pH thereof to predetermined values between 2.75 and 3.45 and, at each adjustment, the precipitate is removed by filtration and analyzed. The analyses are provided below and demonstrate that at a pH value of 3.45 or below the precipitate contains 12% to 16% $P_2O_5$, 27% to 31% F and less than 0.43% $SiO_2$. Furthermore, it is found that at pH 3.45, more than 99% of the total fluorine content and approximately 33% of the total $P_2O_5$ is separated from the pond water.

| pH | Percent constituent in the precipitate | | | |
|---|---|---|---|---|
| | $P_2O_5$ | F | CaO | $SiO_2$ |
| 2.75 | 12.55 | 31.67 | 49.28 | 0.34 |
| 3.00 | 13.85 | 29.68 | 50.48 | 0.33 |
| 3.25 | 15.55 | 29.80 | 48.58 | 0.43 |
| 3.45 | 16.10 | 27.26 | 49.58 | 0.41 |

EXAMPLE 4

Pond water (8.75 pounds) analyzing 8570 p.p.m. $P_2O_5$ and 3660 p.p.m. F, and having a pH of about 1.8 is placed in a first stage liming vessel equipped with a stirrer. Slaked lime (10% by weight CaO in water) is added to the agitated vessel until a pH of 3.25 is attained; 0.08 pound of lime is required. The solids are removed from the liquid by filtration, dried, and analyzed. A total of 0.153 lb. of solids are recovered containing 15.55% $P_2O_5$ (0.0238 lb.), 29.80% F (0.0456 lb.) and 0.43% $SiO_2$. These solids are suitable for the preparation of HF and $P_2O_5$ recovery by the methods described in Example 2. The liquid from the above filtration step is further treated with lime (0.043 lb.) to a pH of 5.3, upon which further precipitation occurs. This precipitate is removed by filtration and dried. The dried precipitate weighing .0802 pound contains 42% $P_2O_5$, less than 0.2% F. This material may be used as a food-grade feed supplement for animals. Finally, the water from the above filtration step is limed to a pH of about 6.5, the residual solids removed by settling and discarded, and the treated water discharged to public streams.

EXAMPLE 5

Following the procedure of Example 2, 155 grams of the filter cake obtained by the procedure of Example 1 are placed in a 5-gallon plastic jug fitted with a burette and gas exit conduit. Four hundred grams of 96–97% $H_2SO_4$ are added slowly via the burette and the jug contents are manually agitated. The gases evolved (HF and water vapor) are swept by an air flow created with a vacuum pump from the reactor vessel through a cooling coil immersed in an ice bath and thence into two ice-water cooled scrubbers each containing 100 g. of distilled water. The air flow is maintained for 2 hours after the sulfuric acid has been added.

Analytical data were obtained on (1) the scrubbers (2) the washed solid phase which is removed by filtration from the residue in the jug, and (3) the liquid phase from the filtration and washing. The data is shown below:

| | | Percent | | | Weight, g. |
|---|---|---|---|---|---|
| | | F | $P_2O_5$ | $H_2SO_4$ | |
| (1) | Scrubber No. 1 | 15.86 | | | 120 |
| | Scrubber No. 2 | 6.86 | | | 107 |
| (2) | Solid phase | 1.00 | 0.73 | 58.90 | 190 |
| (3) | Liquid phase [1] | 0.14 | 1.93 | 15.92 | 893 |

[1] Includes added distilled water used for washing the filter cake. From the above data and the analysis of the starting material, the following material balance can be calculated:

| | | Grams removed | | | | Unaccounted for |
|---|---|---|---|---|---|---|
| | In*, g. | 1st scrubber | 2d scrubber | Solid | Liquid | |
| Fluorine | 43.06 | 19.03 | 10.91 | 1.9 | 1.25 | 9.97 |
| $P_2O_5$ | 15.51 | | | 1.39 | 17.23 | |

* Starting material.

The above data show that 29.94 g. of the original 43.06 g. (69.5%) of fluorine is recovered in the scrubbers. Some is lost in the exit stream from the second scrubber; additional scrubbers will increase recovery efficiency.

I claim:
1. A process for purifying dilute aqueous acidic phosphatic solutions containing calcium, iron, aluminum, silica, sulfate ion, from about 0.3% to about 3.0% $P_2O_5$ by weight and from about 0.15% to about 1.5% fluorine by weight, wherein fluoride and $P_2O_5$ values are recovered for subsequent use which comprises:
   (1) contacting said phosphatic solution with sufficient aqueous lime solution to adjust the pH thereof to between about 3.2 to 3.5 whereby a calcium fluoride precipitate is formed, said precipitate containing about 99% of the available fluorine;
   (2) separating the precipitate from said solution to produce a defluorinated liquid effluent;
   (3) contacting said separated precipitate with at least about a stoichiometric amount (based on calcium fluoride content) of an acid selected from the group consisting of sulfuric acid, glacial acetic acid and perchloric acid at a temperature between about 20°

C. and about 100° C. thereby evolving the fluorine contained therein as hydrogen fluoride gas;

(4) contacting the evolved hydrogen fluoride with a hydrogen fluoride absorbing liquid to recover said fluoride.

2. The process of claim 1 wherein said hydrogen fluoride absorbing liquid is selected from the group consisting of water, aqueous caustic, and aqueous solutions of hydrofluoric acid.

3. The process of claim 1 wherein the pH in step (1) is between about 3.2 and about 3.5.

4. The process of claim 1 further including the steps of
 (a) contacting the defluorinated liquid effluent from step (2) with sufficient aqueous lime solution to adjust the pH thereof to between about 6.0 and 7.0; and
 (b) removing the solids produced by the pH adjustment of step (a) from the lime treated effluent; and then
 (c) discharging the solution produced in step (b) to waste or recycling the solution to a wet process phosphoric acid plant.

5. The process of claim 1 further including the step of recovering $P_2O_5$ values from the defluorinated reaction mixture of step (3).

6. The process of claim 5 further including the steps of:
 (a) contacting the defluorinated liquid effluent from step (2) with sufficient aqueous lime solution to adjust the pH thereof to between about 6.0 and 7.0; and
 (b) removing the solids produced by the pH adjustment of step (a) from the lime treated effluent and then
 (c) discharging the solution produced in step (b) to waste or recycling the solution to a wet process phosphoric acid plant.

7. The process of claim 1 wherein the liquid of step (4) is water.

8. A process for purifying dilute aqueous acidic phosphatic solutions containing calcium, iron, aluminum, silica, sulfate ion, from about 0.3% to about 3.0% $P_2O_5$ by weight and from about 0.15% to about 1.5% fluorine by weight, wherein fluoride and $P_2O_5$ values are recovered for subsequent use which comprises:

(1) contacting said phosphatic solution with sufficient aqueous lime solution to adjust the pH thereof to between about 3.2 to 3.5 whereby a calcium fluoride precipitate is formed, said precipitate containing about 99% of the available fluorine;

(2) separating the precipitate from said solution to produce a defluorinated liquid effluent;

(3) forming a partially neutralized effluent by contacting the defluorinated liquid effluent with sufficient aqueous lime solution to adjust the pH thereof to between about 4.7 and about 5.6, thereby forming a second precipitate;

(4) separating said precipitate from the partially neutralized effluent, and recovering the $P_2O_5$ values in the precipitate;

(5) forming a neutralized effluent by contacting said partially neutralized effluent with sufficient aqueous lime solution to adjust the pH thereof to between about 6.0 and 7.0;

(6) removing the solids produced by the pH adjustment of step (5) from the lime treated neutralized effluent;

(7) discharging the solution produced in step (6) to waste or recycling the solution to a wet process phosphoric acid plant;

(8) contacting said separated precipitate from step (2) with at least about a stoichiometric amount (based on calcium fluoride content) of an acid selected from the group consisting of sulfuric acid, glacial acetic acid and perchloric acid at a temperature between about 20° C. and about 100° C. thereby evolving the fluorine contained therein as hydrogen fluoride gas;

(9) contacting the evolved hydrogen fluoride with water to recover said fluoride.

References Cited

UNITED STATES PATENTS 3,323,864  6/1967  Lapple _____ 23—153 X
3,161,466  12/1964  Fallin _____ 23—109

OTHER REFERENCES

Mellor, Treatise on Inorganic Chemistry, vol. II, pp. 127–129 (Longmans, Green, 1922).

OSCAR R. VERTIZ, Primary Examiner

C. B. RODMAN, Assistant Examiner

U.S. Cl. X.R.

23—153

UNITED STATES PATENT OFFICE
CERTIFICATE OF CORRECTION

Patent No. 3,625,648          Dated December 7, 1971

Inventor(s) Donald Richard Randolph

It is certified that error appears in the above-identified patent and that said Letters Patent are hereby corrected as shown below:

Column 1, lines 15-17, "aluminum and less than about 3% $P_2O_5$ and 1.5% fluorine, and recovering the $P_2O_5$ and fluorine values therefrom in a useable form." should read -- covered in useable form from the solutions which can then be discharged as waste or recycled to a wet process phosphoric acid plant. --

Column 2, line 59, "where" should read -- were --.

Column 5, line 7, "$Ca(H_2PO_4)_2 \cdot HO+$" should read -- $Ca(H_2PO_4)_2 \cdot H_2O$ --.

Column 7, line 8 under column $SO_4=$, "1.75" should read -- 1.74 --.

Column 7, line 35, "F" should read -- $SiO_2$ --.

Signed and sealed this 2nd day of May 1972.

(SEAL)
Attest:

EDWARD M. FLETCHER, JR.
Attesting Officer

ROBERT GOTTSCHALK
Commissioner of Patents